(12) United States Patent
Stoutenburg et al.

(10) Patent No.: US 6,488,203 B1
(45) Date of Patent: Dec. 3, 2002

(54) METHOD AND SYSTEM FOR PERFORMING MONEY TRANSFER TRANSACTIONS

(75) Inventors: Earney E. Stoutenburg, Highland, CO (US); Dean A. Seifert, Parker, CO (US)

(73) Assignee: First Data Corporation, Hackensack, NJ (US)

(*) Notice: Subject to any disclaimer, the term of this patent is extended or adjusted under 35 U.S.C. 154(b) by 0 days.

(21) Appl. No.: 09/427,249

(22) Filed: Oct. 26, 1999

(51) Int. Cl.[7] .............................................. G06F 17/60
(52) U.S. Cl. ......................... 235/379; 235/382; 705/39
(58) Field of Search ................................. 235/379, 380, 235/382, 472.02; 705/35, 39, 40

(56) References Cited

U.S. PATENT DOCUMENTS

| | | | |
|---|---|---|---|
| 4,032,931 A | | 6/1977 | Haker |
| 4,454,414 A | * | 6/1984 | Benton ........................ 235/379 |
| 5,283,829 A | * | 2/1994 | Anderson ..................... 380/24 |
| 5,461,217 A | | 10/1995 | Claus |
| 5,650,604 A | | 7/1997 | Marcous et al. |
| 5,764,888 A | | 6/1998 | Bolan et al. |
| 5,787,403 A | | 7/1998 | Randle |
| 5,897,989 A | * | 4/1999 | Beecham ........................ 435/5 |
| 5,899,982 A | * | 5/1999 | Randle ........................ 705/35 |
| 5,902,983 A | | 5/1999 | Crevelt et al. |
| 5,903,881 A | | 5/1999 | Schrader et al. |
| 5,913,202 A | | 6/1999 | Motoyama |
| 5,920,848 A | | 7/1999 | Schutzer et al. |
| 5,949,044 A | * | 9/1999 | Walker et al. ............... 235/379 |
| 6,003,763 A | * | 12/1999 | Gallagher et al. ........... 235/379 |
| 6,027,216 A | * | 2/2000 | Guyton ........................ 351/200 |
| 6,035,406 A | * | 3/2000 | Moussa et al. .............. 713/202 |
| 6,039,250 A | * | 3/2000 | Ito et al. ...................... 235/380 |
| 6,064,990 A | | 5/2000 | Goldsmith |
| 6,070,156 A | * | 5/2000 | Hartsell et al. .............. 705/413 |
| 6,275,829 B1 | | 8/2001 | Angiulo et al. |
| 6,314,169 B1 | * | 11/2001 | Schelberg, Jr. et al. .. 379/93.12 |

* cited by examiner

Primary Examiner—Thien M. Le
Assistant Examiner—Daniel St. Cyr
(74) Attorney, Agent, or Firm—Brooks & Kushman, P.C.

(57) ABSTRACT

A method of performing a send money transfer transaction through a financial services institution includes storing transaction details on a data base, wherein the transaction details include a desired amount of money to be sent; establishing a code that corresponds to the transaction details stored on the data base; entering the code into an electronic transaction fulfillment device in communication with the data base to retrieve the transaction details from the data base; and determining a collect amount based on the transaction details. A system for performing a send money transfer transaction is also disclosed.

51 Claims, 4 Drawing Sheets

METHOD AND SYSTEM FOR PERFORMING MONEY TRANSFER TRANSACTIONS

TECHNICAL FIELD

The invention relates to a method and system for performing a send money transfer transaction with a financial services institution.

BACKGROUND ART

Money transfer transactions performed with a financial services institution include send transactions and receive transactions. Under a send transaction, a sender sends or "wires" money to a recipient through the financial services institution. Under a receive transaction, the recipient receives money through the financial services institution. Many such transactions are also facilitated by other businesses, companies or organizations that act as agents of the financial services institution. Furthermore, both the sender and the recipient may be referred to as customers of the financial services institution and/or the agent.

A prior method of performing a send transaction involves a sender completing a transaction form and providing the form to an agent. The transaction form includes such information as the desired amount of money to be sent, sender information, and recipient information. The agent then enters the information from the transaction form into a computer that is in communication with a central data base of the financial services institution. Alternatively, the agent may read the information to a representative of the financial services institution, and the representative may provide additional information to the agent that is added to the transaction form. Next, the agent collects from the sender the desired amount of money to be sent plus any applicable fees and/or taxes.

Because this method requires the sender to complete the transaction form, and further requires the agent to either input all information included on the transaction form into the computer, or convey the information to a representative of the financial services institution, the method is time-consuming and error prone. Furthermore, the method does not account for language barriers that may arise should the sender speak a different language than the agent.

Another method of performing a send transaction involves providing a telephone at an agent location with which a sender can access an operator of a financial services institution. The sender then provides information to the operator, such as recipient name, desired amount of money to be sent, and agent location. Next, the operator transmits a transaction form, which includes the information provided by the sender, to an agent at the agent location via a facsimile transmittal machine. The sender then signs the transaction form. Next, the agent collects from the sender the desired amount of money to be sent plus any applicable fees and/or taxes. The agent then signs the transaction form and transmits the form back to the operator. Next, the operator enters the information from the transaction form into a central data base of the financial services institution.

Still another method of performing a send transaction includes providing a sender an access card that is used to access a central data base of a financial services institution. The sender provides the access card to an agent, and the agent retrieves from the central data base a list of potential recipient names previously identified by the sender. After the list has been retrieved, the sender selects a desired recipient from the list, and provides a desired amount of money to be sent to the selected recipient. Next, the agent collects from the sender the desired amount of money to be sent plus any applicable fees and/or taxes.

A prior method of performing a receive transaction involves a sender providing a recipient a money transfer control number (MTCN), which represents a unique key to the transaction information stored in the data base. The MTCN is then provided to an agent by the recipient. Next, the agent accesses the data base and obtains a receive amount that corresponds to the MTCN. The agent then issues a check, money order, or cash to the recipient for the receive amount.

DISCLOSURE OF INVENTION

The present invention overcomes the shortcomings of the prior art by providing an improved method and system for performing a send money transfer transaction, wherein the method and system reduce total transaction time and increase accuracy compared with prior art methods and systems.

Under the invention, a method of performing a send money transfer transaction through a financial services institution includes storing transaction details on a data base, wherein the transaction details include a desired amount of money to be sent; establishing a code that corresponds to the transaction details stored on the data base; entering the code into an electronic transaction fulfillment device in communication with the data base to retrieve the transaction details from the data base; and determining a collect amount based on the transaction details.

The method may further include providing a customer direct access to the data base in order for the financial services institution and/or agent to receive the transaction details from the customer. Alternatively, the method may further include providing a customer direct access to an employee of the financial services institution in order to receive the transaction details from the customer. Advantageously, in either case, a form is not required to be completed by the customer.

Preferably, the code is provided as a numeric code so that it may be entered into an electronic transaction fulfillment device having only a numeric keypad. Alternatively, the code may include one or more alpha-numeric characters, symbols, sounds and/or images. For example, the code may be the customer's name, voice print, fingerprint, retinal image, or facial image.

Under the invention, a system for performing a send money transfer transaction includes a data base for storing transaction details, and a transaction staging device in communication with the data base for establishing a code that corresponds to the transaction details. An electronic transaction fulfillment device is also in communication with the data base. The electronic fulfillment device is configured to receive the code and to retrieve the transaction details from the data base based on the code.

These and other objects, features and advantages of the invention are readily apparent from the following detailed description of best modes for carrying out the invention when taken in conjunction with the accompanying drawings.

BEST MODES FOR CARRYING OUT THE INVENTION

Figure 1:
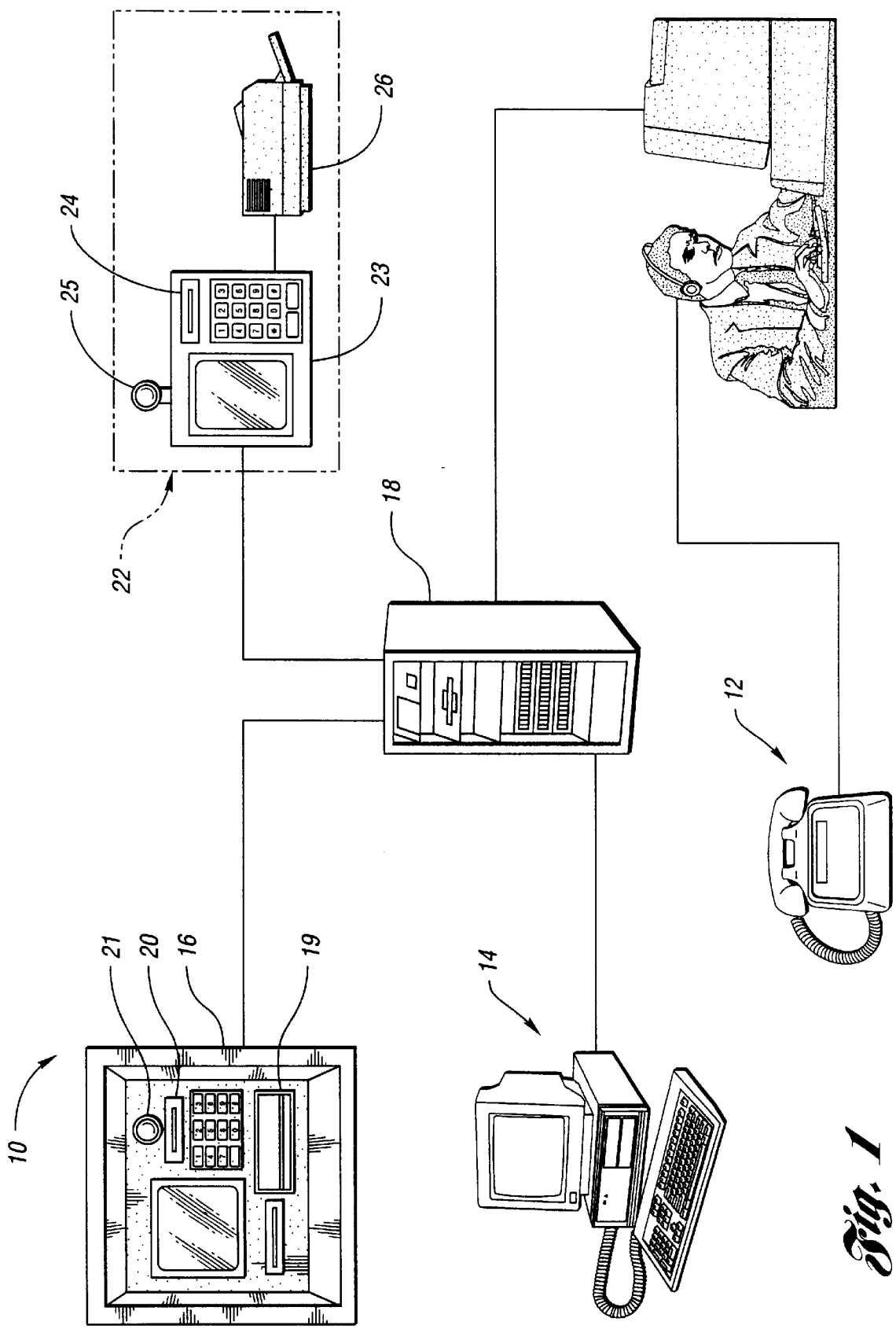
FIG. 1 is a schematic diagram of one embodiment of a system according to the invention for performing a money transfer transaction through a financial services institution.

FIG. 1 shows a system 10 according to the invention for performing an electronic data transfer to effect a money transfer transaction with a financial services institution. Such money transfer transactions include send transactions and receive transactions. Under a send transaction, a sender electronically sends or "wires" money to a recipient through the financial services institution. Under a receive transaction, the recipient receives the money through the financial services institution. These money transfer transactions may also be facilitated by an agent that may receive a commission for each transaction. Agent, as used herein, refers to a person who assists in one or more money transfer transactions through the financial services institution, but is not a direct employee of the financial services institution. Furthermore, both the sender and the recipient may be referred to as customers of the financial services institution and/or the agent.

The system 10 includes one or more transaction set-up or staging devices, such as a telephone 12, a personal computer 14, and/or a kiosk 16. The personal computer 14 has an alpha-numeric keypad, a central processing unit and a display device such as a monitor. The kiosk 16 is an unattended electronic device capable of receiving input and displaying information. For example, the kiosk 16 may be an automated teller machine or ATM.

These transaction staging devices are used to access the financial services institution and to obtain and/or provide transaction details regarding a particular transaction as explained below in greater detail. Advantageously, the transaction staging devices may be disposed at numerous locations remote from the financial services institution to provide extensive access to the financial services institution. For example, one or more transaction staging devices may be disposed at each of several agent locations, such as convenience stores, drug stores, or other suitable facilities. As another example, one or more transaction staging devices may be disposed at the consumer's home or place of business.

The telephone 12 is preferably configured to provide direct and immediate access to a customer services representative (CSR) or other employee of the financial services institution. For example, the telephone 12 may be automatically connected to the CSR simply by picking up the handset. Alternatively, the telephone 12 may be any type of telephone such as a pay telephone, cellular telephone, or home telephone. Furthermore, the CSR has access to a central data base or host computer 18 of the financial services institution, and the CSR can enter information into and receive information from the host computer 18. Alternatively, the CSR may have access to a secondary data base that is in communication with the host computer 18.

The personal computer 14 and kiosk 16 are also in communication with the host computer 18 either directly or indirectly, such as through a secondary data base. Advantageously, the sender and/or recipient may use the personal computer 14 and/or kiosk 16 to directly or indirectly access the host computer 18. For example, the sender may use the personal computer 14 to access the host computer 18 through the internet. The kiosk 16 may also be provided with a card encoder or dispenser 19, a card reader 20, and a scanning device 21 such as a voice scanner, fingerprint scanner, a retina scanner or a face scanner. Alternatively, the kiosk 16 may be provided with multiple scanning devices.

The system 10 further includes an electronic transaction fulfillment device, such as an electronic terminal 22 having a keypad 23, for completing the money transfer transaction. Alternatively or supplementally, the electronic terminal 22 may be provided with a card reader 24 and/or a scanning device 25 such as a fingerprint scanner, a retina scanner or a face scanner. Furthermore, the electronic terminal 22 may be provided with multiple scanning devices. The electronic terminal 22 is in communication with the host computer 18, and is used to retrieve transaction details stored on the host computer 18. In one embodiment of the system 10, the electronic terminal 22 is a personal computer having an alpha-numeric keypad, a central processing unit, and a display device such as a monitor. In another embodiment of the system 10, the electronic terminal 22 is an FDX-400® available from Western Union of Englewood, Colo. The FDX-400® has a numeric keypad, one or more function keys and a display device.

The electronic terminal 22 also preferably includes a printer 26 for printing a record of the money transfer transaction. For example, the electronic terminal 22 may be used to print a receipt and/or a negotiable instrument, such as a check or money order. Alternatively, a printer may be provided as a separate component that is in communication with the electronic terminal 22 and the host computer 18.

It should be noted that the transaction staging device and the transaction fulfillment device may be the same device. For example, if the kiosk 16 is able to print a record of the money transfer transaction through an on-board printer or a remote printer, the kiosk 16 may also function as the transaction fulfillment device. As another example, if the electronic terminal 22 is able to receive alpha-numeric input, the electronic terminal 22 may also function as the transaction staging device.

Figure 2:
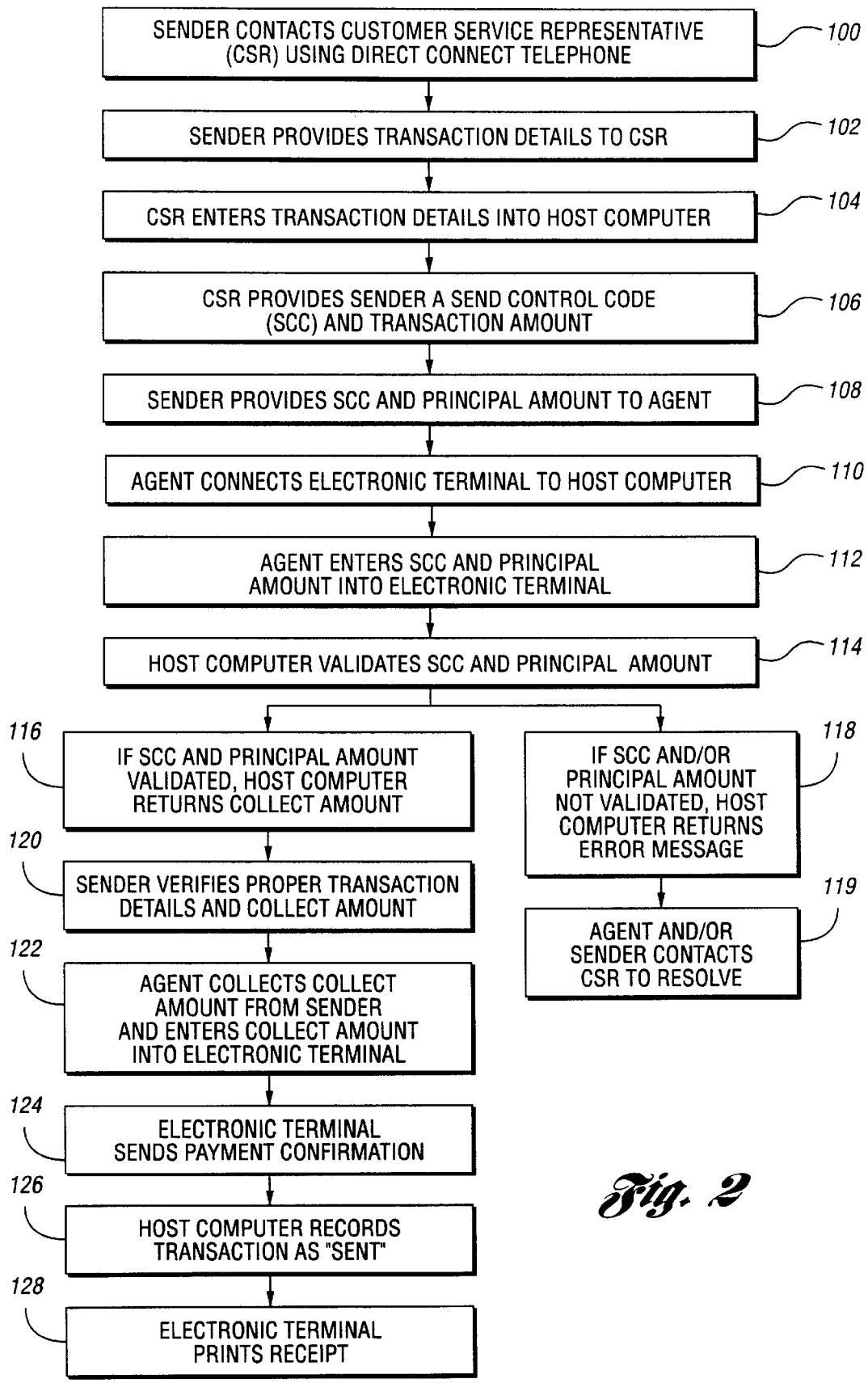
FIG. 2 is a flow chart illustrating operation of a system or method according to the invention for performing a send transaction.

FIG. 2 is a flow chart illustrating operation of a method or system, such as the system 10, for performing a send transaction according to the invention. The send transaction can be divided into a transaction set-up or staging process and a transaction fulfillment process. At step 100, the sender begins the transaction staging process by using the telephone 12 to contact the CSR. Next, the sender provides transaction information or details to the CSR at step 102. Such details may include the sender's name and address, recipient name, and a desired amount of money to be sent to the recipient, which may be referred to as principal amount. At step 104, the CSR enters the transaction details into the host computer 18, which stores the transaction details. It is to be understood that the transaction details are not necessarily entered immediately into the host computer 18. For example, the CSR may enter the transaction details into a separate computer that downloads data to the host computer 18 at a later time. If the desired amount of money to be sent is over a certain amount, the host computer 18 may also request supplemental information from the sender, such as driver's license number, social security number, date of birth, etc. in order to comply with institutional and/or regulatory requirements.

At step 106, the CSR provides the sender a send control code (SCC) and a transaction amount, which represents the principal amount plus any transaction fee and taxes, if applicable. If a printer is located proximate the telephone 12, the SCC and transaction amount may be printed on paper. The SCC and transaction amount are also stored on the host computer 18 as part of the transaction details. The SCC is preferably a numeric code and is used to uniquely identify the send transaction on the host computer 18. The SCC may, however, comprise one or more alpha-numeric characters, symbols, sounds, and/or images. For example, the SCC may be the sender's name, the recipient's name, a bar code, or other decipherable symbol or symbols. Furthermore, the SCC may be printed using an optical character recognition font (OCR), and/or magnetic ink.

Alternatively, the SCC and transaction amount may be obtained or otherwise established by using the personal computer 14, the kiosk 16, or any other suitable transaction staging device to access the host computer 18 directly or indirectly. For example, the personal computer 14 may be used to access the host computer 18 through the internet, and the host computer 18 may provide the SCC and the transaction amount directly to the sender such as by electronic mail. As another example, if the kiosk 16 is provided with one of the scanning devices 21 described above, the kiosk 16 may be used to establish the SCC as the sender's voice print, fingerprint, retinal image, facial image and/or other anatomical image. As another example, if the kiosk 16 or other transaction staging device is provided with the card dispenser 19, the kiosk 16 may be used to encode and dispense a card with the SCC and/or the transaction amount printed or otherwise encoded, such as magnetically or electronically, thereon. As yet another example, a source of cards having different SCC's pre-printed or otherwise encoded thereon, may also be disposed proximate the kiosk 16. During the transaction staging process, one of the cards may be selected by the sender and swiped across or otherwise entered into the card reader 20 of the kiosk 16 so that the host computer 18 can correlate the particular SCC with the transaction details entered by the sender. The host computer 18 may then provide the transaction amount to the sender.

Once the SCC and transaction amount have been obtained by the sender, the transaction staging process is complete. At this point, the send transaction is maintained on the host computer 18 in a pending state. If the send transaction does not progress to the transaction fulfillment process within a predetermined amount of time, the send transaction may be purged from the host computer 18.

Because the sender can deal directly with the CSR or host computer 18, the transaction staging process is relatively simple and efficient. As a result, money transfer transactions may be performed at a variety of locations, such as convenience stores, drug stores, service stations and the like, thereby increasing the distribution network of the financial services institution. Advantageously, there are no forms that need to be completed by the sender, nor are any agents required to be involved in the transaction staging process. Furthermore, the sender may be provided access to various CSR's having various foreign language competencies in order to accommodate language differences.

At step 108, the sender begins the transaction fulfillment process by providing the SCC and principal amount, or just the SCC, to an agent at the agent location. Next, the agent connects the electronic terminal 22 to the host computer 18 by pressing a function key on the keypad 23 at step 110. At step 112, the agent enters the SCC and the principal amount into the electronic terminal 22 by using the keypad 23. Advantageously, because the SCC is preferably a numeric code, the keypad 23 need only include numbers and one or more function keys. Alternatively, the SCC may be entered into the electronic terminal 22 using the card reader 24 or the scanning device 25.

At step 114, the host computer 18 may validate the SCC and principal amount by comparing the SCC and principal amount with the transaction details previously stored on the host computer 18 during the transaction staging process. If the SCC and/or principal amount are valid, the host computer 18 returns some or all of the transaction details and a collect amount, which is the same as the transaction amount, to the electronic terminal 22 as indicated at step 116. Alternatively, some or all of the transaction details may be routed to the electronic terminal 22, or other transaction fulfillment device, prior to the sender entering the SCC. For example, multiple send transactions may be queued on the electronic terminal 22, with each transaction being identified by a particular sender's name. In this case, the SCC is the particular sender's name, and the transaction fulfillment process may be commenced by the sender highlighting or otherwise entering his/her name into the electronic terminal 22.

If the SCC and principal amount are not valid, the host computer 18 returns an error message to the electronic terminal 22 as indicated at step 118. The agent and/or sender may then contact the CSR to resolve the error as indicated at step 119.

If the SCC code and principal amount are valid, the agent verifies with the sender that the proper transaction details and collect amount were returned by the host computer 18, as indicated at step 120. For example, the sender may view the transaction details on a display device of the electronic terminal 22. If the transaction details are not correct, and if the electronic terminal 22 can accept alpha-numeric input, the agent and/or sender may be able to revise the transaction details. Alternatively, the agent and/or sender may contact the CSR to revise the transaction details.

Next, the agent collects the collect amount from the sender and enters the amount tendered into the electronic terminal 22 at step 122. The electronic terminal 22 then sends payment confirmation to the host computer 18 at step 124. Next, at step 126, the host computer 18 records the send transaction as "sent" and sends confirmation to the electronic terminal 22. At this point, funds are available to be picked up by the recipient. At step 128, the electronic terminal prints a receipt for the sender.

Because the agent need not be involved in the transaction staging portion of each send transaction, the agent can process significantly more send transactions in the same amount of time compared with prior systems and methods. Furthermore, because the transaction fulfillment portion is controlled by the host computer 18, agents require less training to operate the system and method of the invention.

Alternatively, the transaction fulfillment process may be accomplished without an agent. For example, the transaction fulfillment process may be carried out by using the kiosk 16 or any other suitable device that is connected directly to or in communication with the host computer 18. The transaction fulfillment process may be commenced by the sender entering the SCC into the kiosk 16 using a keypad, card reader 20, and/or scanning device 21 of the kiosk 16, depending on the type of SCC.

Figure 3:
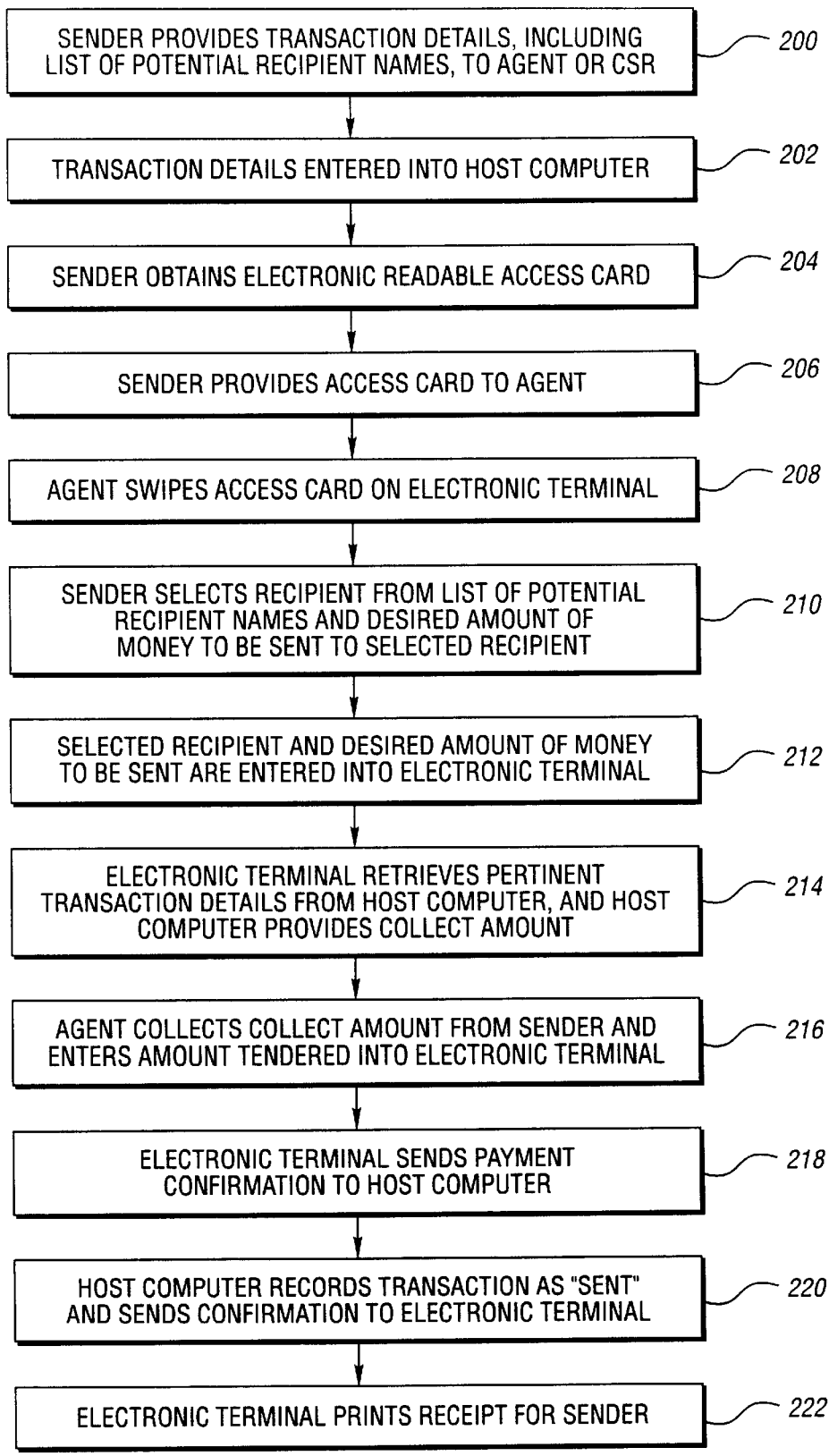
FIG. 3 is a flow chart illustrating operation of a system or method according to the invention for performing a card-assisted send transaction.

FIG. 3 is a flow chart illustrating operation of a method or system, such as the system 10, for performing a card-assisted send transaction according to the invention. Similar to the send transaction, the card-assisted send transaction can be divided into a transaction set-up or staging process and a transaction fulfillment process. At step 200, the transaction staging process begins by the sender providing transaction details to an agent at the agent location or to the CSR or other employee of the financial services institution. Transaction details may include a list of one or more potential recipient names; information about each recipient such as address and telephone number; and information about the sender such as name, address and telephone number. The transaction details are then entered into the host computer 18 at step 202. Next, at step 204, the sender obtains an access card from the financial services institution for accessing the transaction details stored on the host computer 18. The access card contains a card control code (CCC) that corresponds to the particular transaction details provided by consumer, and the CCC is readable by an electronic device, such as the electronic terminal 22. Alternatively, the access card may be generated by the financial services institution based on historical transactions of the sender.

At step 206, the transaction fulfillment process begins by the sender providing the access card to the agent at the agent location. Next, at step 208, the agent enters the CCC into the electronic terminal 22 by swiping the access card on the electronic terminal 22 to thereby access or retrieve the list of potential recipient names. For example, the list of potential recipient names may be displayed on a display device of the electronic terminal 22. Alternatively, the CCC may be entered into the electronic terminal 22 in any suitable manner such as by manually entering the control code on the keypad 23.

At step 210, the sender then selects a recipient from the list of potential recipient names and a desired amount of money to be sent to the selected recipient. The selected recipient and the desired amount of money to be sent are entered into the electronic terminal 22 at step 212. If the desired amount of money to be sent is over a certain amount, the host computer 18 may also request supplemental information from the sender, such as driver's license number, social security number, date of birth, etc. in order to comply with institutional and/or regulatory requirements. Next, at step 214, the electronic terminal retrieves pertinent transaction details from the host computer 18, and the host computer provides a collect amount, which represents the desired amount of money to be sent plus any transaction fee and taxes, if applicable. The agent then collects the collect amount from the sender and enters the amount tendered into the electronic terminal 22 at step 216. The electronic terminal 22 then sends payment confirmation to the host computer 18 at step 218. Next, at step 220, the host computer 18 records the send transaction as "sent" and sends confirmation to the electronic terminal 22. At step 222, the electronic terminal 22 prints a receipt for the sender. It should be noted that for future card-assisted transactions, steps 200 and 202 need only be performed if necessary to update or otherwise modify the list of recipient names or other transaction details.

Alternatively, the access card may be used with the kiosk 16 or other transaction staging device to initiate direct contact with the CSR. For example, the access card may be swiped on the kiosk 16 to initiate a video conference with the CSR. The CCC from the access card is then used to retrieve pertinent transaction details from the host computer 18, including the list of potential recipient names. The sender then selects a recipient from the list of potential recipient names, and provides a desired amount of money to be sent to the selected recipient. Next, the CSR provides the sender a SCC and a transaction amount to complete the transaction staging process. The transaction fulfillment process may then proceed in a manner similar to the transaction fulfillment process described above and illustrated in FIG. 2.

As yet another alternative, the access card may be used with the kiosk 16 or other transaction staging device to obtain direct access to the host computer 18. For example, the access card may be swiped on the kiosk 16 to establish a direct or indirect connection to the host computer 18. The transaction staging process and the transaction fulfillment process may then be carried out on the kiosk 16 by responding to questions generated by the host computer 18 and displayed on the kiosk 16.

Figure 4:
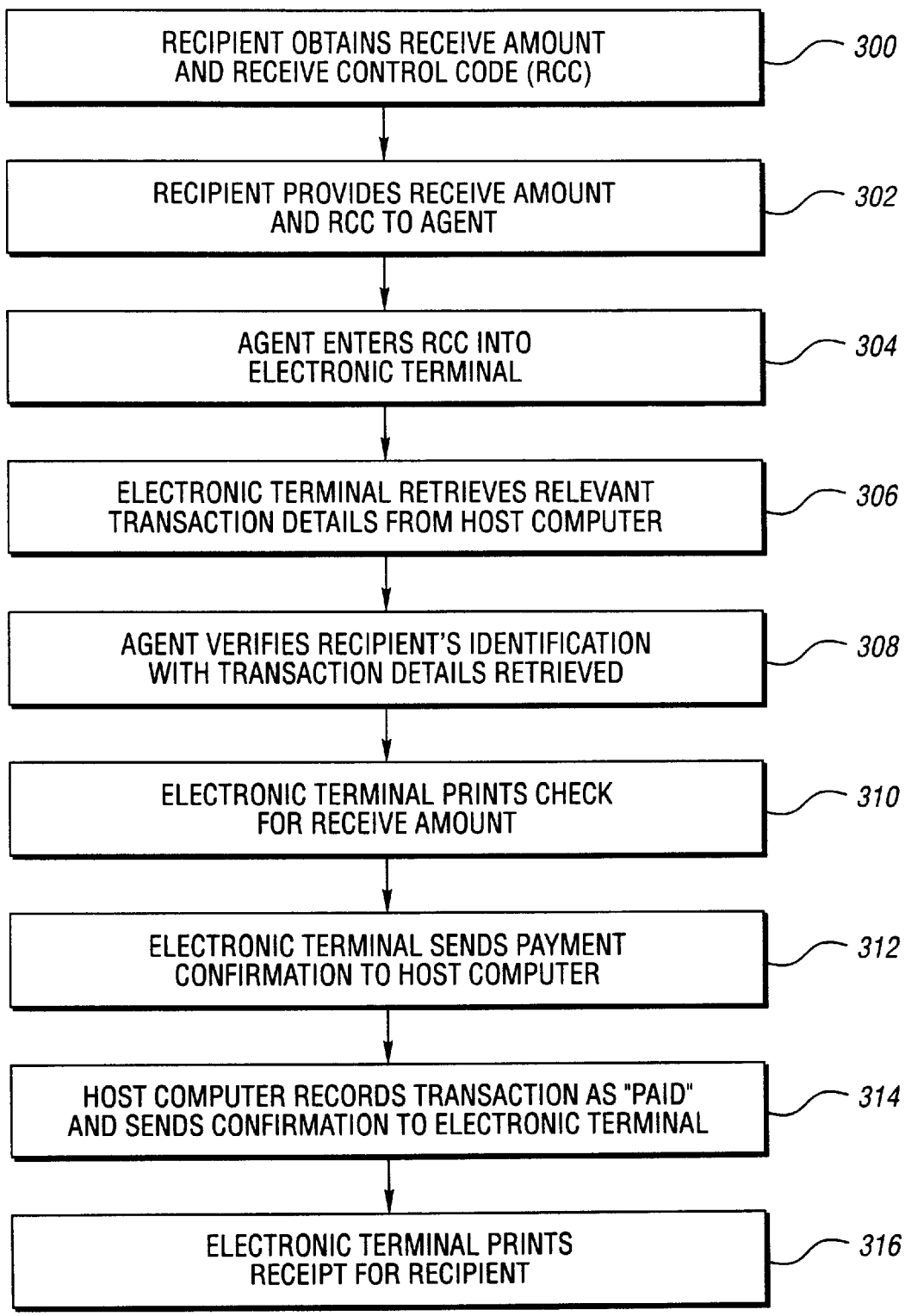
FIG. 4 is a flow chart illustrating operation of a system or method according to the invention for performing a receive transaction.

FIG. 4 is a flow chart illustrating operation of a method or system, such as the system 10, for performing a receive transaction according to the invention. The receive transaction can also be divided into a transaction set-up or staging process and a transaction fulfillment process. At step 300, the transaction staging process begins with the recipient obtaining a receive amount and a receive control code (RCC) for uniquely identifying the receive transaction on the host computer 18. The RCC may be obtained from the CSR using the telephone 12. Alternatively, the RCC may be obtained using any suitable electronic transaction staging device. While the RCC is preferably a numeric code, the RCC may comprise any combination of alpha-numeric characters or other symbols. For example, the RCC may be the recipient's name. In addition, the RCC may only be valid for a predetermined amount of time, such as 15 minutes, and/or at a predetermined location or locations so as to reduce the potential for theft and/or fraud.

At step 302, the recipient begins the transaction fulfillment process by providing the receive amount and RCC to an agent at the agent location. At step 304, the agent enters the receive amount and RCC into the electronic terminal 22. Next, at step 306, the electronic terminal 22 retrieves all relevant transaction details from the host computer 18 via a connection with the host computer 18. If the receive amount is over a certain amount, the host computer 18 may also request supplemental information from the recipient, such as driver's license number, social security number, date of birth, etc. in order to comply with institutional and/or regulatory requirements. At step 308, the agent verifies the recipient's identification with the transaction details retrieved. Next, at step 310, the electronic terminal 22 is used to print a check or other negotiable instrument, such as a cash voucher, for the receive amount. Advantageously, the electronic terminal 22 may be used to print multiple checks or other negotiable instruments if desired by the recipient. Alternatively, the agent may dispense a telephone card and/or money card to the recipient. The agent may also load funds onto a card provided by the recipient. At step 312, the electronic terminal 22 sends payment confirmation to the host computer 18. Next, at step 314, the host computer 18 records the transaction as "paid" and sends confirmation to the electronic terminal 22. At step 316, the electronic terminal 22 prints a receipt for the recipient.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of performing a money transfer send transaction, the method comprising:

providing a sender direct access to an employee of a financial services institution in order to receive transaction details from the sender;

storing, on a data base, the transaction details provided by the sender, wherein the transaction details include a desired amount of money to be sent by the sender to a recipient;

establishing a code that corresponds to the transaction details stored on the data base, wherein the code is established for use by the sender during the send transaction;

storing the code on the data base such that the code is useable to identify the send transaction on the data base;

entering the code into an electronic transaction fulfillment device in communication with the data base to retrieve the transaction details from the data base after the step of storing the code on the data base; and determining a collect amount, to be collected from the sender, based on the transaction details;

wherein the code is not provided by or to the recipient for use by the recipient during the send transaction.

2. The method of claim 1 wherein providing a sender direct access to an employee of a financial services institution comprises providing an access card to the sender that is used on an electronic staging device to initiate a video conference with the employee.

3. The method of claim 1 wherein establishing a code comprises providing a numeric code to the sender, and wherein entering the code comprises entering the code on a numeric key pad of the electronic transaction fulfillment device.

4. The method of claim 1 wherein establishing a code comprises providing the code on an electronically readable card, and wherein entering the code comprises introducing the card into a card reader of the electronic transaction fulfillment device.

5. The method of claim 1 wherein establishing a code comprises printing the code using an optical character recognition font.

6. The method of claim 1 wherein establishing a code comprises printing the code using magnetic ink.

7. The method of claim 1 wherein establishing a code comprises establishing the code as a voice print, and wherein entering the code comprises entering the voice print into the electronic transaction fulfillment device using a voice scanner.

8. The method of claim 1 wherein establishing a code comprises establishing the code as an anatomical image, and wherein entering the code comprises entering the anatomical image into the electronic transaction fulfillment device using an image scanner.

9. The method of claim 1 wherein establishing a code comprises establishing the code as a fingerprint, and wherein entering the code comprises entering the fingerprint into the electronic transaction fulfillment device using a fingerprint scanner.

10. The method of claim 1 wherein establishing a code comprises establishing the code as a retinal image, and wherein entering the code comprises entering the retinal image into the electronic transaction fulfillment device using a retina scanner.

11. The method of claim 1 wherein establishing a code comprises establishing the code as a facial image, and wherein entering the code comprises entering the facial image into the electronic transaction fulfillment device using a face scanner.

12. The method of claim 1 wherein establishing a code comprises providing the code through the employee of the financial services institution.

13. The method of claim 1 wherein establishing a code comprises establishing the code through an electronic transaction staging device.

14. The method of claim 15 wherein the electronic transaction staging device and the electronic transaction fulfillment device are the same.

15. The method of claim 1 wherein the electronic fulfillment device is a kiosk.

16. The method of claim 1 further comprising:

collecting the collect amount;

notifying the data base that the collect amount has been collected; and recording the transaction as sent.

17. The method of claim 1 further comprising printing a record corresponding to the money transfer transaction.

18. The method of claim 17 wherein printing a record comprises printing a negotiable instrument based on the code.

19. The method of claim 17 wherein printing a record comprises printing a receipt based on the code.

20. A method of performing a money transfer send transaction through a financial services institution, the method comprising:

providing a sender direct access to an employee of the financial services institution in order to receive transaction details from the sender, wherein the transaction details include a desired amount of money to be sent by the sender to a recipient;

storing the transaction details on a data base;

providing to the sender, via the employee of the financial services institution, a numeric code that corresponds to the transaction details stored on the data base, wherein the code is provided for use by the sender during the send transaction;

storing the code on the data base;

entering the code into an electronic terminal in communication with the data base to retrieve the transaction details from the data base after the step of storing the code on the data base;

determining a collect amount based on the transaction details; and collecting the collect amount from the sender;

wherein the code is not provided by or to the recipient for use by the recipient during the send transaction.

21. A system for performing a money transfer send transaction, the system comprising:

a transaction staging device for providing a sender direct access to an employee of a financial services institution in order to receive transaction details from the sender;

a data base for storing the transaction details and a code that corresponds to the transactions details; and an electronic transaction fulfillment device in communication with the data base, the electronic transaction fulfillment device being configured to receive the code and to retrieve the transaction details from the data base based on the code;

wherein the database is configured to validate the code received by the electronic transaction fulfillment device, and to provide a collect amount, to be collected from the sender, to the electronic transaction fulfillment device.

22. The system of claim 21 wherein the transaction staging device includes an encoder for encoding the code on a card, and the electronic transaction fulfillment device includes a card reader for receiving the card in order to read the code therefrom.

23. The system of claim 21 wherein the transaction staging device includes a first voice scanner for establishing the code as a voice print, and wherein the electronic transaction fulfillment device includes a second voice scanner for receiving the voice print.

24. The system of claim 21 wherein the transaction staging device includes a first anatomical image scanner for establishing the code as an anatomical image, and wherein the electronic transaction fulfillment device includes a second anatomical image scanner for receiving the anatomical image.

25. The system of claim 24 wherein the first anatomical image scanner includes a first fingerprint scanner for establishing the code as a fingerprint, and wherein the second anatomical image scanner includes a second fingerprint scanner for receiving the fingerprint.

26. The system of claim 24 wherein the first anatomical image scanner includes a first retina scanner for establishing the code as a retinal image, and wherein the second anatomical image scanner includes a second retina scanner for receiving the retinal image.

27. The system of claim 24 wherein the first anatomical image scanner includes a first face scanner for establishing the code as a facial image, and wherein the second anatomical image scanner includes a second face scanner for receiving the facial image.

28. A method of performing a money transfer send transaction, the method comprising:
   a) storing, on a data base, transaction details provided by a sender through a transaction staging device that provides the sender direct access to an employee of a financial services institution, wherein the transaction details include a desired amount of money to be sent by the sender to a recipient;
   b) storing, on the data base, a code for use by the sender during the send transaction, wherein the code corresponds to the transaction details stored on the data base;
   c) receiving at the data base an entry provided by the sender and corresponding to the code;
   d) validating the entry; and
   e) providing, by the data base, a collect amount, to be collected from the sender, to an electronic transaction fulfillment device in communication with the data base if the entry is valid, wherein the collect amount is based on the desired amount of money to be sent;
   wherein the code is not provided by or to the recipient for use by the recipient during the send transaction.

29. The method of claim 28 wherein the code includes a number.

30. The method of claim 28 wherein the code includes a letter.

31. The method of claim 28 wherein the code includes a symbol.

32. The method of claim 28 wherein the code includes a voice print.

33. The method of claim 28 wherein the code includes an anatomical image.

34. The method of claim 28 wherein the code includes a fingerprint.

35. The method of claim 28 wherein the code includes a retinal image.

36. The method of claim 28 wherein the code includes a facial image.

37. The method of claim 28 wherein step c) includes receiving, at the data base, the entry from the electronic transaction fulfillment device.

38. The method of claim 28 further comprising receiving at the data base an additional entry, corresponding to the desired amount of money, from the electronic transaction fulfillment device, and validating the additional entry at the data base prior to performing step e).

39. A method of performing a money transfer send transaction, the method comprising:
   receiving, by an employee of a financial services institution, transaction details provided by a sender through a transaction staging device that provides the sender direct access to the employee of the financial services institution, wherein the transaction details include a desired amount of money to be sent by the sender to a recipient;
   storing the transaction details on a data base of the financial services institution;
   providing to the sender, via the employee of the financial services institution, a numeric code that corresponds to the transaction details stored on the data base, wherein the code is provided for use by the sender during the send transaction;
   receiving at the data base an entry, provided by the sender and corresponding to each of the desired amount of money to be sent and the code, from an electronic transaction fulfillment device in communication with the data base;
   validating the entry at the data base; and
   providing a collect amount, to be collected from the sender, to the electronic transaction fulfillment device if the entry is valid, wherein the collect amount is based on the desired amount of money to be sent;
   wherein the code is not provided by or to the recipient for use by the recipient during the send transaction.

40. A method of performing a money transfer send transaction, the method comprising:
   storing, on a data base, transaction details provided by a sender through a transaction staging device that provides the sender direct access to an employee of a financial services institution, wherein the transaction details include a desired amount of money to be sent by the sender to a recipient;
   establishing a code that corresponds to the transaction details stored on the data base, wherein the code is established for use by the sender during the send transaction;
   storing the code on the data base;
   receiving the code at an electronic transaction fulfillment device in communication with the data base after the step of storing the code on the data base;
   determining a collect amount, to be collected from the sender, based on the transaction details; and
   providing, by the data base, the collect amount and the transaction details to the electronic transaction fulfillment device;
   wherein the code is not provided by or to the recipient for use by the recipient during the send transaction.

41. The method of claim 40 wherein establishing a code comprises providing a numeric code to the sender, and wherein receiving the code comprises receiving the code through a numeric key pad of the electronic transaction fulfillment device.

42. The method of claim 39 wherein establishing a code comprises providing the code on an electronically readable card, and wherein receiving the code comprises receiving the card in a card reader of the electronic transaction fulfillment device.

43. The method of claim 39 wherein establishing a code comprises printing the code using an optical character recognition font.

44. The method of claim 39 wherein establishing a code comprises printing the code using magnetic ink.

45. The method of claim 39 wherein establishing a code comprises establishing the code as a voice print, and wherein receiving the code comprises receiving the voice print at the electronic transaction fulfillment device through a voice scanner.

46. The method of claim 39 wherein establishing a code comprises establishing the code as an anatomical image, and wherein receiving the code comprises receiving the anatomical image at the electronic transaction fulfillment device through an image scanner.

47. The method of claim 39 wherein establishing a code comprises establishing the code as a fingerprint, and wherein receiving the code comprises receiving the fingerprint at the electronic transaction fulfillment device through a fingerprint scanner.

48. The method of claim 39 wherein establishing a code comprises establishing the code as a retinal image, and wherein receiving the code comprises receiving the retinal image at the electronic transaction fulfillment device through a retina scanner.

49. The method of claim 39 wherein establishing a code comprises establishing the code as a facial image, and wherein receiving the code comprises receiving the facial image at the electronic transaction fulfillment device through a face scanner.

50. The method of claim 40 wherein establishing a code comprises providing the code to the sender through the employee of the financial services institution.

51. The method of claim 40 wherein establishing a code comprises establishing the code through the transaction staging device.

* * * * *

UNITED STATES PATENT AND TRADEMARK OFFICE
CERTIFICATE OF CORRECTION

PATENT NO. : 6,488,203 B1  Page 1 of 1
DATED : December 3, 2002
INVENTOR(S) : Stoutenburg et al.

It is certified that error appears in the above-identified patent and that said Letters Patent is hereby corrected as shown below:

Column 12,
Line 63, delete "39" and insert -- 40 -- therefor.

Column 13,
Lines 1, 4, 6, 11 and 16, delete "39" and insert -- 40 -- therefor.

Column 14,
Lines 1 and 6, delete "39" and insert -- 40 -- therefor.

Signed and Sealed this

Twenty-fourth Day of June, 2003

JAMES E. ROGAN
*Director of the United States Patent and Trademark Office*